US006782608B2

(12) United States Patent
Ohsumi et al.

(10) Patent No.: US 6,782,608 B2
(45) Date of Patent: Aug. 31, 2004

(54) TERMINAL-CRIMPING MOLD

(75) Inventors: Hideki Ohsumi, Shizuoka (JP); Yoshimi Wada, Shizuoka (JP)

(73) Assignee: Yazaki Corporation, Shizuoka (JP)

( * ) Notice: Subject to any disclaimer, the term of this patent is extended or adjusted under 35 U.S.C. 154(b) by 104 days.

(21) Appl. No.: 10/259,457

(22) Filed: Sep. 30, 2002

(65) Prior Publication Data

US 2003/0022563 A1 Jan. 30, 2003

Related U.S. Application Data

(62) Division of application No. 09/494,024, filed on Jan. 31, 2000, now Pat. No. 6,513,235, which is a division of application No. 09/241,731, filed on Feb. 2, 1999, now Pat. No. 6,068,527.

(30) Foreign Application Priority Data

Feb. 3, 1998 (JP) ........................................ P. 10-22294

(51) Int. Cl.[7] ........................ B23P 19/00; H01R 43/042

(52) U.S. Cl. ............................ 29/753; 29/747; 29/748; 29/751; 29/761; 29/857; 29/861; 72/412; 72/416; 439/279; 439/281; 439/877; 439/884; 439/885; 439/882

(58) Field of Search .......................... 29/747, 748, 751, 29/753, 761, 857, 861; 72/412, 416; 439/279, 281, 877, 884, 885

(56) References Cited

U.S. PATENT DOCUMENTS

| | | | | |
|---|---|---|---|---|
| 3,032,602 A | | 5/1962 | Farnell | 174/84 C |
| 3,051,773 A | | 8/1962 | Batcheller | 174/94 R |
| 4,067,105 A | | 1/1978 | Zahn et al. | 29/628 |
| 4,517,764 A | * | 5/1985 | Dedolph | 47/77 |

(List continued on next page.)

FOREIGN PATENT DOCUMENTS

| | | | | |
|---|---|---|---|---|
| DE | 39 08 867 A1 | | 3/1989 | |
| DE | 43 00 951 C1 | | 1/1993 | |
| DE | 43 39 749 A1 | | 11/1993 | |
| DE | 297 21 752 U1 | | 12/1997 | |
| JP | 9-134749 | | 5/1997 | |
| JP | 09147937 A | * | 6/1997 | H01R/9/03 |
| JP | 09223522 A | | 8/1997 | |

OTHER PUBLICATIONS

"Unibody plastic injection–molded optical sub–assembly for large core fiber"; Trewhella, J.M.; Oprysko, M.M.; Backhauss, H.; Ritter, M.; Cina, M.; Electronic Components and Technology Conference, May 28–31, 1996; pp. 1116–1121.*

*Primary Examiner*—A. Dexter Tugbang
*Assistant Examiner*—Paul D Kim
(74) *Attorney, Agent, or Firm*—Morgan, Lewis & Bockius LLP

(57) ABSTRACT

In a mold for pressing an electric-wire clamping portion of a terminal, a lower side-wall mold part and an upper side-wall mold part are provided for pressing side walls connected to the electric-wire clamping portion. A pressure face substantially continuously connected to a pressure face of an upper conductor mold part is provided on one end side of the upper side-wall mold part. A taper face is provided on the other end side of the upper side-wall mold part so as to be enlarged toward the other end. Accordingly, side walls pressed between the lower side-wall mold part and the upper side-wall mold part are deformed so that the quantity of deformation at one end is near the quantity of compressive deformation of the electric-wire clamping portion and so that the quantity of deformation is reduced gradually toward the other end side. Thus, local stress concentration is not caused in the side walls so that cracks are prevented from occurring in the side walls.

4 Claims, 8 Drawing Sheets

U.S. PATENT DOCUMENTS 4,654,952 A 4/1987 Baldyga .................... 29/566.2
4,815,200 A 3/1989 Ito .............................. 29/857
4,976,132 A 12/1990 Shaffer ........................ 72/416
5,102,344 A 4/1992 Tadokoro et al. ............ 439/98
5,271,874 A * 12/1993 Osipo et al. ................. 264/1.7
5,378,161 A 1/1995 Loder .......................... 439/77
5,415,015 A 5/1995 Klemmer et al. ............ 72/412
5,519,170 A 5/1996 Nabeshima ............... 174/74 R
5,599,214 A 2/1997 Sakai et al. ................. 439/877
5,772,454 A 6/1998 Long, Jr. ..................... 439/83
5,954,533 A 9/1999 Hatagishi et al. ........... 439/397

* cited by examiner

TERMINAL-CRIMPING MOLD

This application is a Divisional patent application under 37 C.F.R. § 1.53(b) of pending prior application Ser. No. 09/494,024 filed on Jan. 31, 2000 now U.S. Pat. No. 6,513,235, which is a Divisional patent application of Ser. No. 09/241,731, filed Feb. 2, 1999 now U.S. Pat. No. 6,068,527.

BACKGROUND OF THE INVENTION

1. Field of the Invention

The present invention relates to a terminal for crimping an electric wire by compressional deformation, and further relates to a terminal-crimping mold for compressively deforming the terminal.

The present application is based on Japanese Patent Application No. Hei. 10-22294, which is incorporated herein by reference.

2. Description of the Related Art

FIG. 13 is a perspective view showing the shape of a terminal A before the terminal is crimped to an electric wire W. An electric-wire clamping portion 2 is provided on one end side (on the right side in FIG. 13) of a base plate 1 of the terminal A, and an electric contact portion 3 is provided on the other end side (on the left side in the drawing) of the base plate 1.

The electric-wire clamping portion 2 includes a conductor crimping portion 4 and a sheath clamping portion 5. The conductor crimping portion 4 has a pair of crimping pieces which are projected up from the opposite sides of the base plate 1, while the sheath clamping portion 5 has a pair of clamping pieces which are projected up from the opposite sides of the base plate 1. Each of the conductor crimping portion 4 and the sheath clamping portion 5 is U-shaped in section. The lower portion of the conductor crimping portion 4 and the lower portion of the sheath clamping portion 5 are integrated, on the opposite sides, with a pair of side walls 6 and 6 which are erected up from the opposite sides of the base plate 1.

FIG. 13 shows the case where the electric contact portion 3 is of a female type. Upper end portions of a pair of side walls 7 erected from the opposite sides of the base plate 1 are further bent inward to form a rectangular pipe portion 8 with the base plate 1. A tongue piece 9 extended at the forward end of the base plate 1 is bent back into the rectangular pipe portion 8. If a male terminal (not shown) is fittingly inserted into a space of the rectangular pipe portion 8 above the tongue piece 9, the male and female terminals are electrically connected to each other.

A pair of side walls 10 erected up from the opposite sides of the base plate 1 are connected between the respective lower portions of the side walls 7 of the electric contact portion 3 and the side walls 6 of the conductor crimping and sheath clamping portions 4 and 5.

The electric wire W is connected to the terminal A is such a manner as follows. An insulating sheath 11 at an end of the electric wire E is stripped to expose a conductor portion 12. The conductor portion 12 is inserted in the conductor crimping portion 4 and the insulating sheath 11 is inserted in the sheath clamping portion 5. Then, both the conductor crimping portion 4 and the sheath clamping portion 5 are pressed so as to be narrowed from the outside. As a result, the conductor crimping portion 4 and the sheath clamping portion 5 are plastically deformed, so that the conductor crimping portion 4 is crimped to the conductor portion 12 and the insulating sheath 11 is held by the sheath clamping portion 5 (see FIG. 14).

The diameter of the insulating sheath 11 is larger than the diameter of the conductor portion 12. Accordingly, before the electric wire W is clamped, the distance between the pair of clamping pieces of the sheath clamping portion 5 is larger than the distance between the pair of crimping pieces of the conductor crimping portion 4 so that a portion 1*a* of the base plate 1 which serves as the bottom of the sheath clamping portion 5 is slightly projected down (see FIG. 13).

Accordingly, the upper surface of a lower sheath mold part 14 on which the sheath clamping portion 5 is placed is lower in level than the upper surface of a lower conductor mold part 13 on which the conductor crimping portion 4 is placed (see FIG. 15).

The crimping mold B for pressing and narrowing the electric-wire clamping portion 2 (the conductor crimping portion 4 and the sheath clamping portion 5) is arranged as shown in FIG. 15. The lower conductor mold part 13 and the lower sheath mold part 14 are disposed so as to be adjacent to each other. An upper conductor mold part 15 and an upper sheath mold part 16 which are driven to move up and down by a pressing apparatus are provided above the lower conductor mold part 13 and the lower sheath mold part 14 respectively.

A pair of moving guide pieces 15*a* which are projected down are provided in the upper conductor mold part 15 (only one piece 15*a* is shown in FIG. 15). When the upper conductor mold part 15 moves up and down, the moving guide pieces 15*a* slide on the opposite side surfaces of the lower conductor mold part 13.

A pair of moving guide pieces 16*a* which are projected down from the upper sheath mold part 16 slide on the opposite side surfaces of the lower sheath mold part 14 similarly to the moving guide pieces 15*a*.

The terminal A is placed so that the conductor crimping portion 4 and the sheath clamping portion are located on the lower conductor mold part 13 and the lower sheath mold part 14 respectively. The conductor crimping portion 4 is crimped between the upper conductor mold part 15 which is moved down and the lower conductor mold part 13. The sheath clamping portion 5 is crimped between the upper sheath mold part 16 which is moved down and the lower sheath mold part 14.

Because the quantity of displacement of the conductor crimping portion 4 crimped thus is different from the quantity of displacement of the sheath clamping portion 5 crimped thus, one of the side walls 6 is pulled toward the conductor crimping portion 4 and the other is pulled toward the sheath clamping portion 5.

Further, because the electric contact portion 3 is not deformed at all, a large force for pulling the conductor crimping portion 4 acts on one of the side walls 10 and a force for preventing the pulling acts on the other of the side walls 10.

Because the height of the side walls 10 is lower than the height of the electric contact portion 3 and than the height of the conductor crimping portion 4, a neck portion 17 is formed between the electric contact portion 3 and the conductor crimping portion 4 (see FIG. 16).

If the height $h_1$ of the side walls 10 is increased in order to reinforce the strength of the neck portion 17, cracks C occur because the height $h_1$ of the side walls 10 is larger than the height $h_2$ of the conductor crimping portion 4' after clamping to make local stress concentrated in upper end portions of the side walls 10 at the time of clamping (see FIGS. 17A and 17B).

Accordingly, there is a problem that the height $h_1$ of the side walls 10 cannot be increased enough to reinforce the neck portion 17.

SUMMARY OF THE INVENTION

A first object of the present invention is therefore to solve the aforementioned problem and to provide a terminal in which cracks are prevented from occurring in side walls connected to a conductor crimping portion when the conductor crimping portion is compressively deformed by a clamping force. A second object of the present invention is to provide a terminal-crimping mold for forming such a terminal.

In order to achieve the above first object, according to the first aspect of the present invention, there is provided a terminal which comprises: a base plate; an electric-wire clamping portion crimped to an electric wire which is inserted in an inside thereof, the electric-wire clamping portion being provided on one end side of the base plate; an electric contact portion, for mating with another terminal, provided on the other end side of the base plate; and side walls erected from opposite sides of the base plate, respectively, the side walls being continuously formed between the electric-wire clamping portion and the electric contact portion, wherein each of the side walls is shaped so that an end portion thereof connected to the electric-wire clamping portion is plastically deformed in the same manner as the crimped shape of the electric-wire clamping portion and so that the quantity of the plastic deformation gradually decreases toward the other end portion of the side wall connected to the electric contact portion.

According to the second aspect of the present invention, there is provided a terminal which comprises: a base plate; a sheath clamping portion, with which an insulating sheath of an electric wire is clamped, provided on one end portion of the base plate; a conductor crimping portion crimped to a conductor portion of the electric wire, the conductor crimping portion being provided in a position separated at a distance from the sheath clamping portion; an electric contact portion, for mating with another terminal, provided on the other end portion of the base plate; a first pair of side walls erected from opposite sides of the base plate, and continuously formed between the electric contact portion and the conductor crimping portion respectively; and a second pair of side walls erected from opposite sides of the base plate, and continuously formed between the conductor crimping portion and the sheath clamping portion respectively, wherein each of the first pair of side walls is shaped so that an end portion thereof connected to the conductor crimping portion is plastically deformed in the same manner as the crimped shape of the conductor crimping portion and so that the quantity of the plastic deformation gradually decreases toward an end portion of the side wall connected to the electric contact portion; and each of the second pair of side walls having one end connected to the sheath clamping portion is shaped so that the one end is plastically deformed in the same manner as the sheath clamping portion and so that the quantity of the plastic deformation gradually decreases or increases from the conductor crimping portion toward the sheath clamping portion. As defined in the terminal according to the second aspect, the quantity of the plastic deformation of the second pair of side walls may gradually decrease or increase from the conductor crimping portion toward the sheath clamping portion.

In order to achieve the above second object, according to the third aspect of the present invention, there is provided a terminal-crimping mold for crimping a terminal to an electric wire, the terminal which includes: a base plate, an electric-wire clamping portion, into which the electric wire is insertable, provided on one end side of the base plate, and side walls erected from opposite sides of the base plate and continuously connected to the electric-wire clamping portion, the terminal-crimping mold, comprising:

- a lower mold part including a lower side-wall mold part continuously connected to the lower mold part; and
- an upper mold part associating with the lower mold part so that the electric-wire clamping portion of the terminal is adapted to be crimped by the lower and upper mold parts to electrically connect the terminal to the electric wire, the upper mold part including: an upper side-wall mold part moved integrally with the upper mold part, wherein one end of a pressure face of the upper side-wall mold part is substantially continuously connected to a pressure face of the upper mold part; and a taper face formed on the other end side of the pressure face of the upper side-wall mold part so as to be enlarged toward the one end side of the pressure face of the upper side-wall mold part. According to the fourth aspect of the present invention, in the above terminal-crimping mold, preferably, the size of the other end of the taper face is set to be a value when the side walls are not pressed.

According to the fifth aspect of the present invention, there is provided a terminal-crimping mold for crimping a terminal to an electric wire, the terminal which includes: a base plate, an electric-wire clamping portion provided on one end side on the base plate, the electric-wire clamping portion including a conductor crimping portion in which a conductor portion of the electric wire is to be inserted, and a sheath clamping portion in which an insulating sheath of the electric wire is to be inserted, an electric contact portion, for mating with another terminal, provided on the other end side of the base plate, and a plurality of side walls provided between the electric contact portion and the conductor crimping portion and between the conductor crimping portion and the sheath clamping portion, the terminal-crimping mold comprising:

- a lower mold part including a lower conductor mold part and a lower side-wall mold part disposed adjacent to the lower conductor mold part; and
- an upper mold part associating with the lower mold part so that the electric-wire clamping portion of the terminal is adapted to be crimped by the lower and upper mold parts to electrically connect the terminal to the electric wire, the upper mold part including: an upper conductor mold part moved toward the lower mold part to press the conductor crimping portion; an upper sheath mold part moved integrally with the upper conductor mold part to press the sheath clamping portion; an intermediate upper mold part inserted between the upper conductor mold part and the upper sheath mold part, the intermediate upper mold part having a pressure face substantially connected to respective pressure faces of the upper conductor mold part and upper sheath mold part; an upper side-wall mold part disposed adjacent to the upper conductor mold part, wherein one end of a pressure face of the upper side-wall mold part is substantially continuously connected to a pressure face of the upper conductor mold part; and a taper face formed on the other end side of the pressure face of the upper side-wall mold part so as to be enlarged toward the one end side of the pressure face of the upper side-wall mold part.

According to the sixth aspect of the present invention, in any of the above terminal-crimping molds, preferably, an intermediate taper face is formed between a pressure face of the upper side-wall mold part and the taper face of the upper side-wall mold part so that the intermediate taper face has an intermediate taper angle between the angle of the pressure face of the upper side-wall mold part and the angle of the taper face of the upper side-wall mold part.

DETAILED DESCRIPTION OF THE PREFERRED EMBODIMENTS

Embodiments of a terminal and a mold for forming the terminal according to the present invention will be described below with reference to the drawings.

First Embodiment

Figure 1:
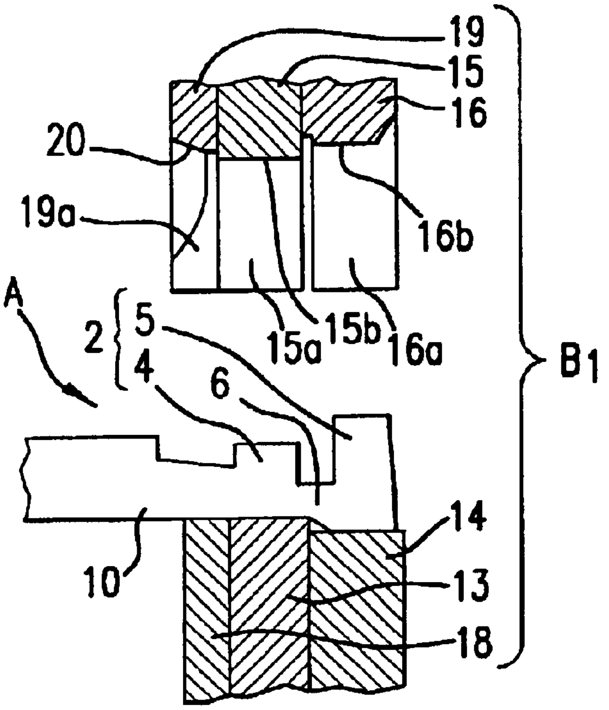
FIG. 1 is a vertical sectional view of a mold of a first embodiment of the present invention.

FIG. 1 is a vertical sectional view of a mold $B_1$ according to a first embodiment of the present invention. The mold $B_1$ is configured in the same manner as the mold B described in the background art in the following point. That is, a lower sheath mold part 14 is disposed so as to be adjacent to a lower conductor mold part 13. An upper conductor mold part 15 provided above the lower conductor mold part 13 moves up and down integrally with an upper sheath mold part 16 provided above the lower sheath mold part 14.

The mold $B_1$ is, however, different from the mold B described in the background art in the following point. That is, the mold $B_1$ includes a side-wall correcting mold which has a lower side-wall mold part 18 disposed adjacent to the lower conductor mold part 13, and an upper side-wall mold part 19 provided above the lower side-wall mold part 18 so as to move up and down integrally with the upper conductor mold part 15.

The upper face of the lower side-wall mold part 18 is the same in level as the upper face of the lower conductor mold part 13. The inner face (pressure face) of the upper side-wall mold part 19 is designed so that the pressure face 19*b* of a right end portion adjacent to the upper conductor mold part 15 has a height so as to be substantially continuously connected to the pressure face 15*b* of the upper conductor mold part 15. Moving guide pieces 19*a* which are projected down from the opposite sides of the upper side-wall mold part 19 slide on the opposite side walls of the lower side-wall mold part 18.

Figure 3:
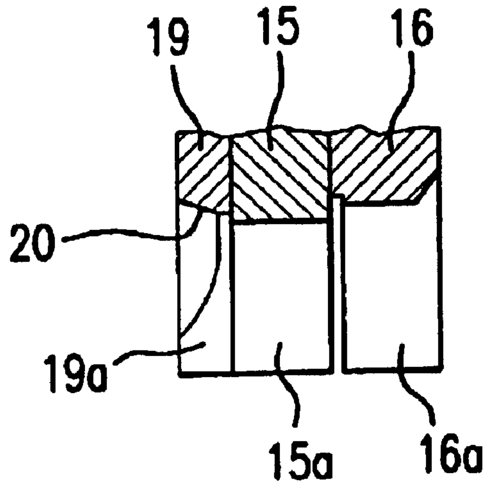
FIG. 3 is a vertical sectional view of a main part of upper mold parts in the case where no level difference is set between the pressure face of the upper side-wall mold part and the pressure face of an upper conductor mold part.
Figure 4:
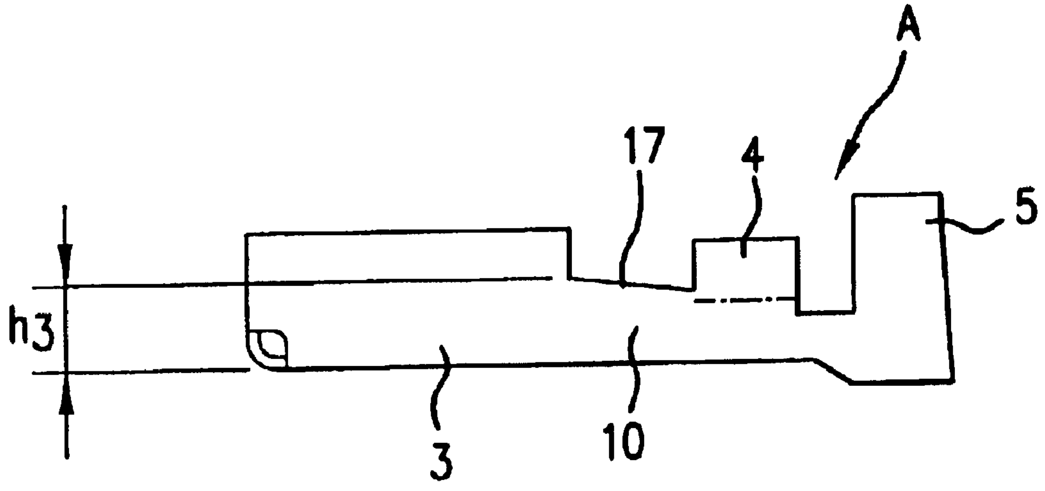
FIG. 4 is a side view showing the shape of a neck portion of the terminal according to the present invention before crimping work.
Figure 5A:
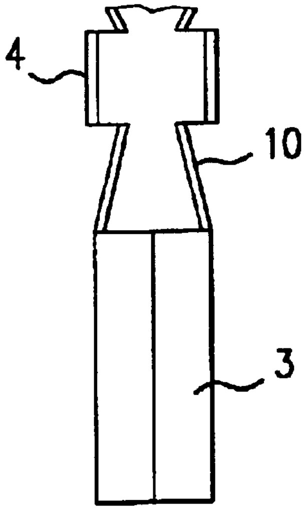
FIGS. 5A to 5C are main part plan views for explaining the state of work-deformation of the terminal.
Figure 5B:
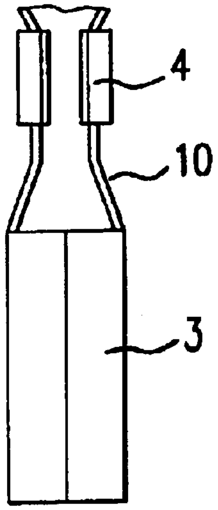
Figure 5C:
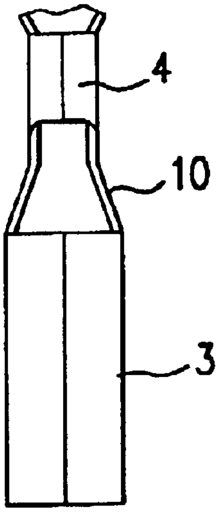

Although FIG. 1 shows the case where the right-end-side pressure face 19*b* of the upper side-wall mold part 19 is connected to the pressure face 15*b* of the upper conductor mold part 15 with a slight level difference, the present invention can be applied also to the case where the right-end-side pressure face 19*b* of the upper side-wall mold part 19 is connected to the pressure face 15*b* of the upper conductor mold part 15 without any level difference as shown in FIG. 3.

Figure 2A:
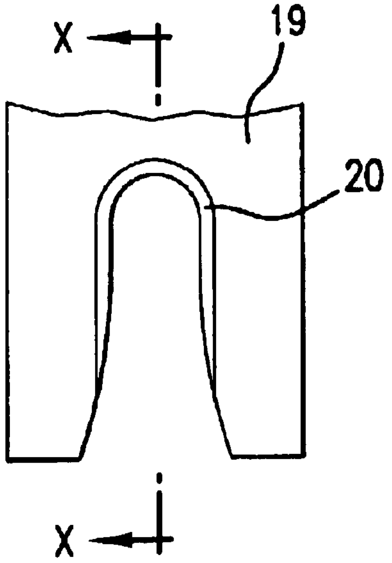
FIG. 2A is a front view of an upper side-wall mold part of the mold in the first embodiment.
Figure 2B:
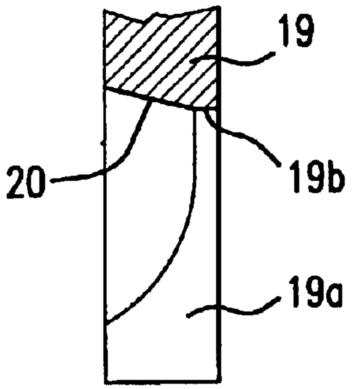
FIG. 2B is a sectional view taken along the line X—X in FIG. 2A.

A taper face 20 is formed in the left of the pressure face 19*b* such that the height of the taper portion 20 is increased toward the left end of the upper side-wall mold part 19 so that the left end portion does not press the side walls 10 (see FIGS. 1, 2A and 2B).

However, even the taper face 20 partially has a pressure face which presses each of the side walls 10, no crack occurs in the side walls 10 if no locally large deformation is generated in the side walls 10 between the pressure face and the non-pressure face. Accordingly, a pressure face within a level not to cause any crack may be provided in the taper face 20.

A terminal A formed by the mold $B_1$ configured as described above will be described below with reference to FIG. 1, FIGS. 5A to 5C, FIGS. 6A to 6C and FIGS. 7A to 7C (since the state of work-deformation of the sheath clamping portion 5 is the same as that described in the background art, the description thereof will be omitted here).

Figure 6A:
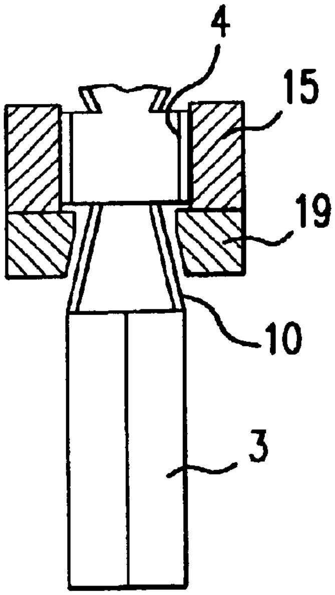
FIGS. 6A to 6C are horizontal sectional views of the mold showing the state of work-deformation of the terminal.
Figure 6B:
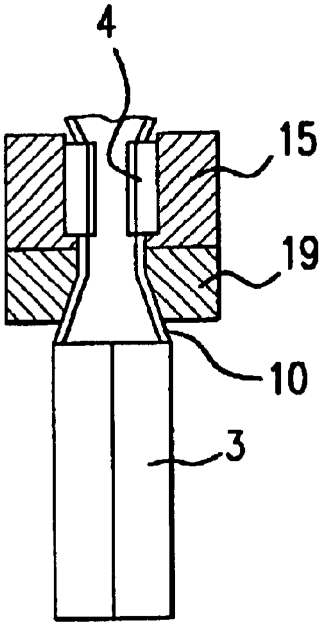
Figure 6C:
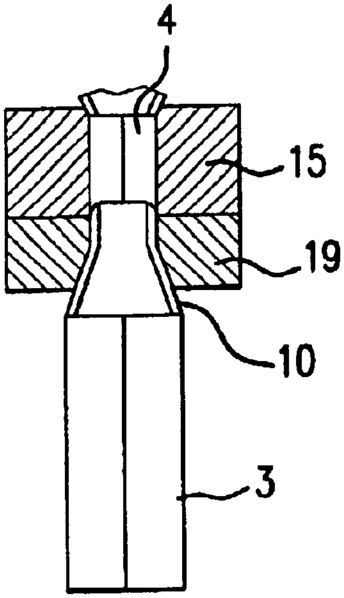
Figure 7A:
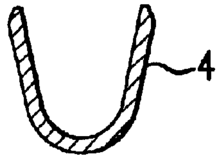
FIGS. 7A to. 7C are sectional views of the conductor crimping portion of the terminal showing the process of deformation of the conductor crimping portion.
Figure 7B:
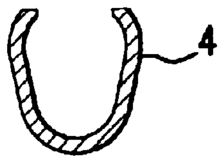
Figure 7C:
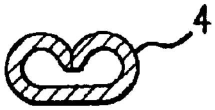

While the terminal A is placed on the lower mold parts 13 and 18, the conductor portion 12 of the electric wire W is inserted in the inside of the conductor crimping portion 4 which is opened so as to be substantially U-shaped (see FIGS. 6A and 7A). Then, the upper conductor mold part 15 moves down integrally with the upper side-wall mold part 19, so that the upper conductor mold part 15 first strikes the conductor crimping portion 4 (see FIG. 6A).

As the upper opening of the conductor crimping portion 4 struck by the upper conductor mold part 15 is narrowed gradually, the upper side-wall mold part 19 strikes the side walls 10. The end portions of the side walls 10 on the conductor crimping portion 4 side are deformed in the same manner as the conductor crimping portion 4. However, the quantity of the deformation is reduced gradually as it goes toward the opposite side end portions of the side walls 10, so that the opposite side end portions of the side walls 10 are not deformed at all (see FIGS. 5B, 6B and 7B).

Figure 13:
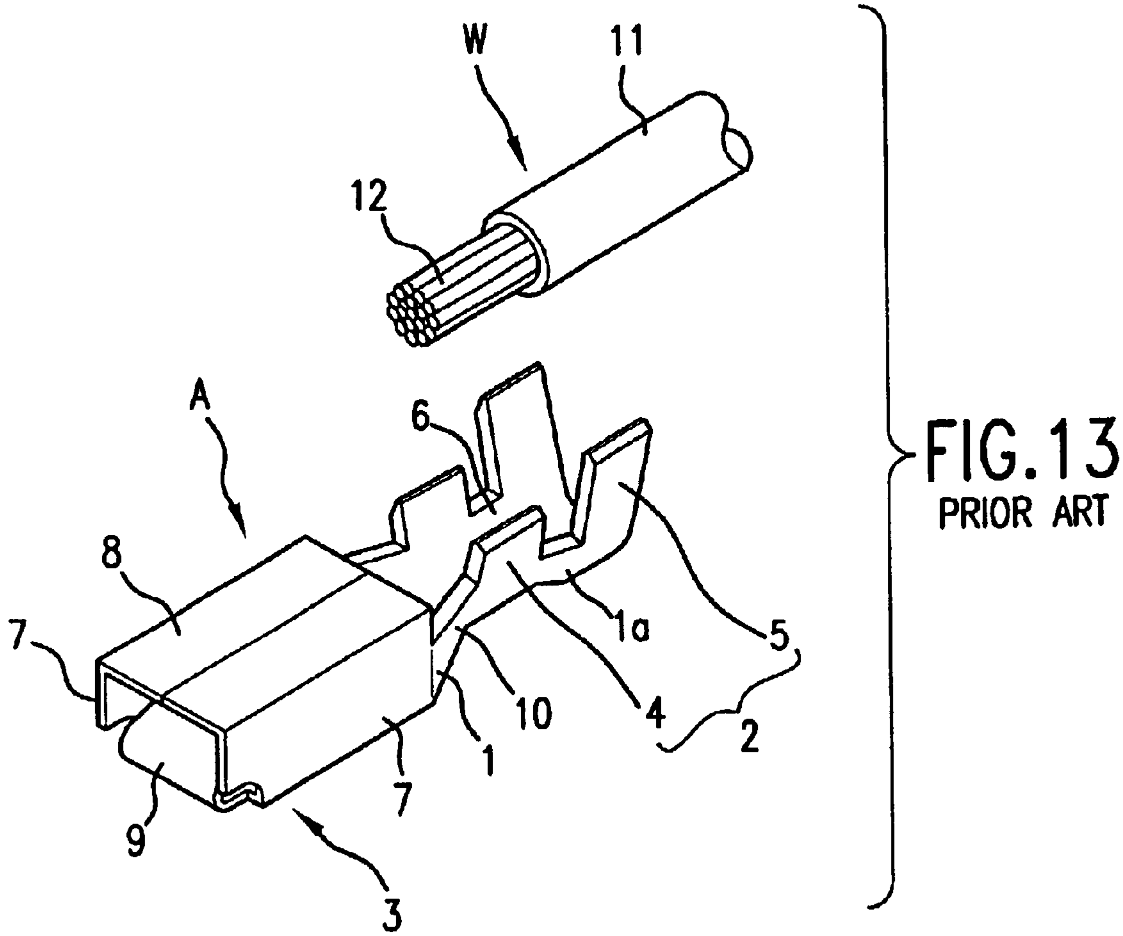
FIG.13 PRIOR ART
FIG. 13 is a perspective view showing the state of an ordinary terminal before clamping.
Figure 14:
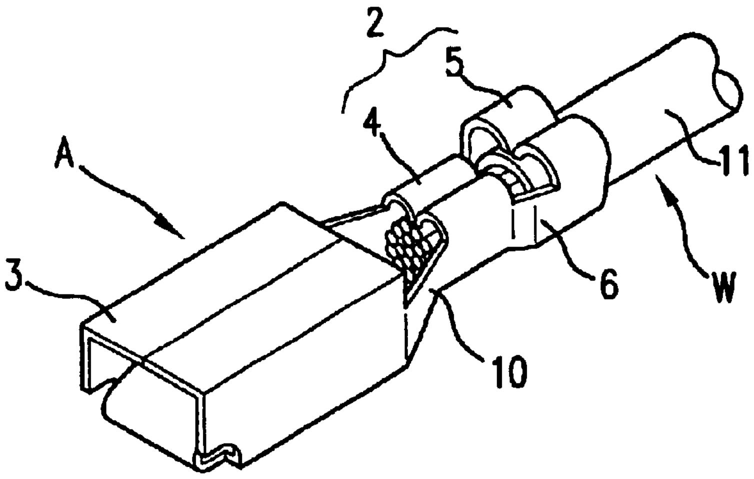
FIG.14 PRIOR ART
FIG. 14 is a perspective view showing the state of the ordinary terminal after crimping work.
Figure 15:
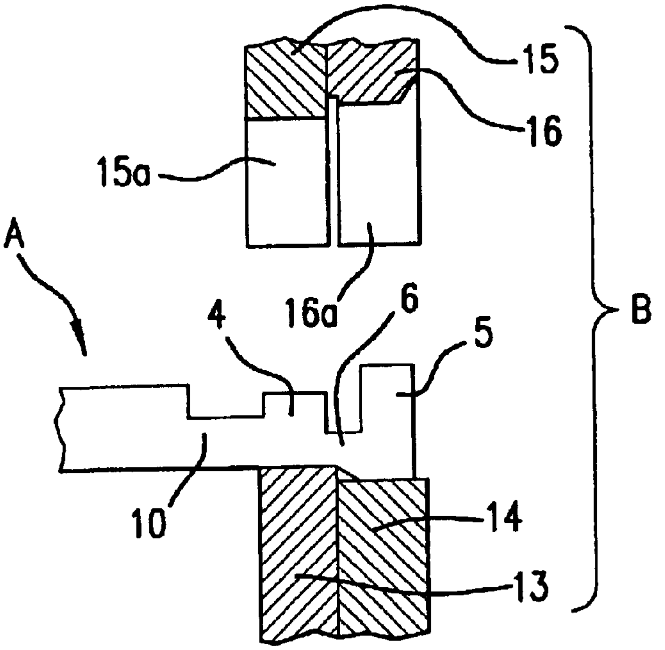
FIG.15 PRIOR ART
FIG. 15 is a vertical sectional view of a mold of the related art.
Figure 16:
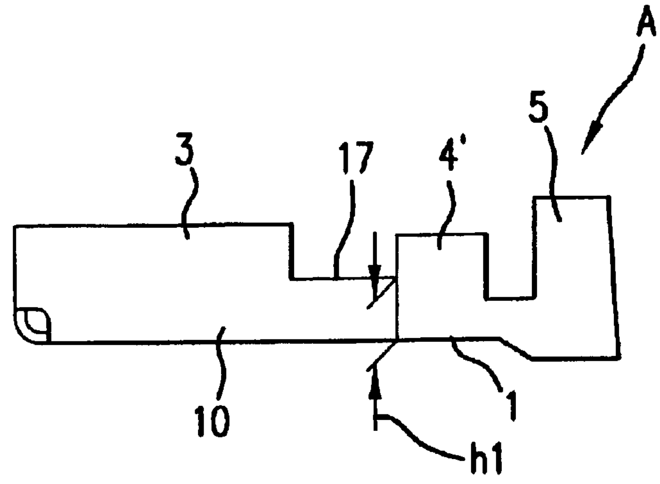
FIG.16 PRIOR ART
FIG. 16 is a side view for explaining a neck portion of the terminal.
Figure 17A:
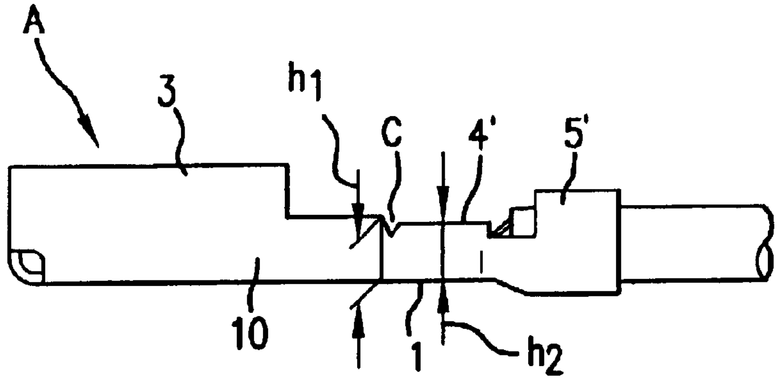
FIG.17A PRIOR ART
FIG. 17A is a side view of the terminal with cracks.
Figure 17B:
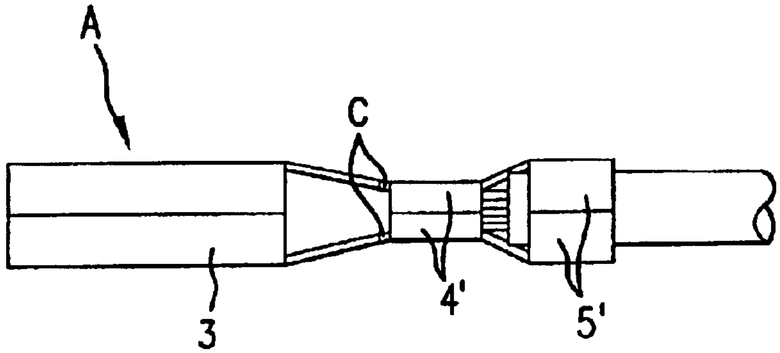
FIG.17B PRIOR ART
FIG. 17B is a plan view of the terminal with cracks.

When the upper mold parts 15 and 19 further move down, the two ends of the conductor crimping portion 4 are closed and deformed so as to be bent inward (see FIG. 7C) so that the conductor crimping portion 4 is electrically connected to the conductor portion 12 (see FIG. 13).

Although the end portions of the side walls 10 on the conductor crimping portion 4 side are deformed so as to be bent inward in the same manner as the conductor crimping portion 4 (see FIG. 5C), the quantity of the deformation is reduced gradually as it goes toward the opposite side end portions of the side walls 10. Accordingly, the opposite side end portions of the side walls 10 are not deformed at all (see FIG. 6C) because the opposite side end portions of the side walls 10 do not touch the taper portion 20 of the upper side-wall mold part 19.

Incidentally, even if the taper portion 20 has a pressure face within a level not to cause any crack, there is no problem.

When the terminal A is pressed by the mold $B_1$, the quantity of deformation of the side walls 10 is reduced gradually as it goes from the conductor crimping portion 4 side toward the other side. Accordingly, the internal stress of the side walls 10 is equalized, and no locally concentrated stress is generated, so that no crack occurs.

Figure 8:
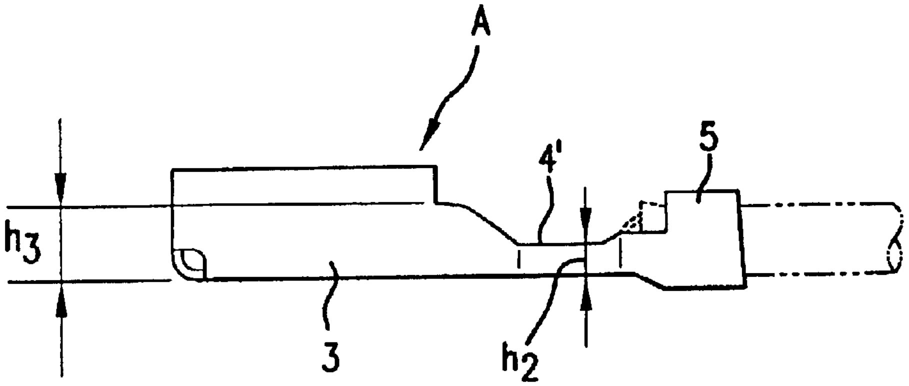
FIG. 8 is a side view for explaining the shape of the terminal after clamping.

Further, even if the height $h_3$ of the side walls 10 is set to be larger than the height $h_2$ of the conductor crimping portion 4' after clamping, the upper ends of the side walls 10 are smoothly connected to the conductor crimping portion 4' after crimping work (see FIG. 8)

Second Embodiment

Figure 9:
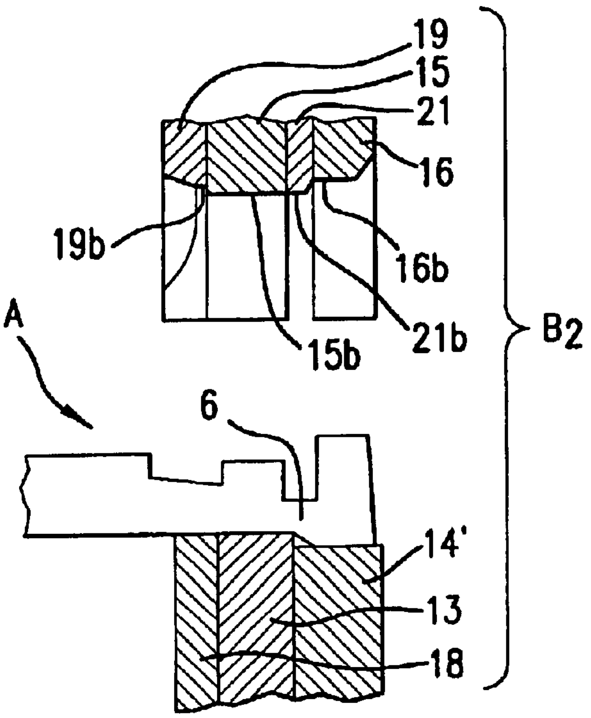
FIG. 9 is a vertical sectional view of the mold according to a second embodiment of the present invention.

FIG. 9 is a vertical sectional view of a mold $B_2$ according to a second embodiment of the present invention. The mold $B_2$ is the same as the mold $B_1$ in the first embodiment in the point that there are provided a lower side-wall mold part 18 adjacent to the lower conductor mold part 13, and an upper side-wall mold part 19 disposed above the lower side-wall mold part 18 so as to move up and down integrally with the upper conductor mold part 15.

However, an intermediate upper mold part 21 is provided between the upper conductor mold part 15 and the upper sheath mold part 16 so as to move up and down integrally with the upper conductor mold part 15 and the upper sheath mold part 16. A lower mold part 14' which includes an intermediate lower mold part and a lower sheath mold part 14 integrated with each other is provided below the intermediate upper mold part 21.

The intermediate upper mold part 21 is located above the side walls 6 of the terminal A. The intermediate upper mold part 21 has a pressure face 21*b* which is shaped so as to smoothly connect the pressure face 15*b* of the upper conductor mold part 15 to the pressure face 16*b* of the upper sheath mold part 16.

Accordingly, even if the quantity of plastic deformation of the conductor crimping portion 4 is different from the quantity of plastic deformation of the sheath clamping portion 5 in the case where the terminal A is clamped by the mold $B_2$, no locally concentrated stress is generated because the internal load of the side walls 6 is equalized.

Although FIG. 9 shows the case where a slight level difference is formed between the pressure face 15*b* of the upper conductor mold part 15 and the right end side pressure face 19*b* of the upper side-wall mold part 19, the present invention can be applied also to the case where no level difference is provided, as shown in FIG. 3.

Figure 10:
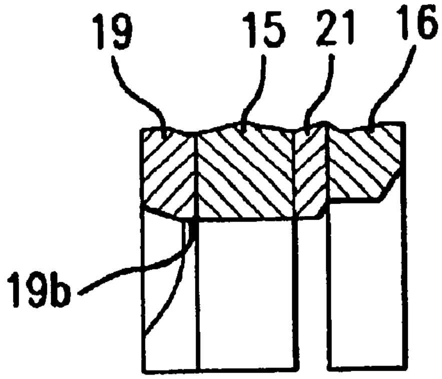
FIG. 10 is a vertical sectional view of a main part of upper mold parts in the case where no level difference is set between the pressure face of the upper conductor mold part and the pressure face of an intermediate upper mold part.

Although a sight level difference is formed also between the pressure face 15*b* of the upper conductor mold part 15 and the pressure face 21*b* of the intermediate upper mold part 21, the present invention can be applied also to the case where no level difference is provided, as shown in FIG. 10.

Figure 11A:
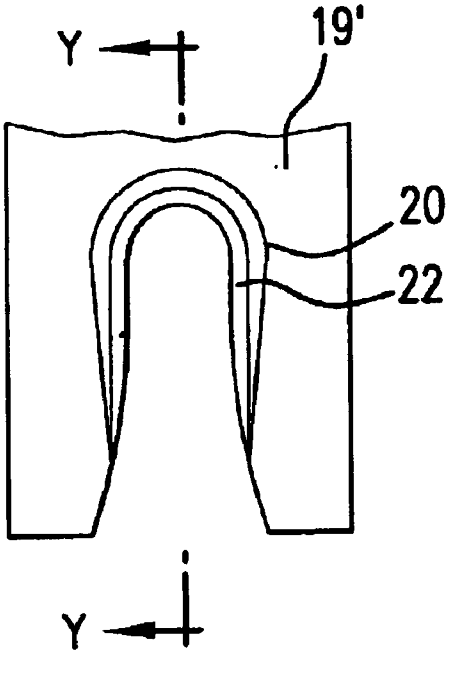
FIG. 11A is a front view of the upper side-wall mold part provided with a double taper portion.
Figure 11B:
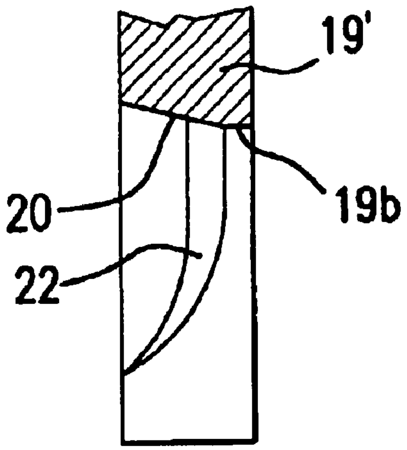
FIG. 11B is a sectional view taken along the line Y—Y in FIG. 11A.

FIGS. 11A and 11B show an upper side-wall mold part 19' which has an intermediate taper face 22 provided between the right side pressure face 19*b* of the upper side-wall mold part 19 and the taper face 20. The intermediate taper face 22 can relax the sudden angle change between the pressure face 19*b* and the taper face 20.

Figure 12:
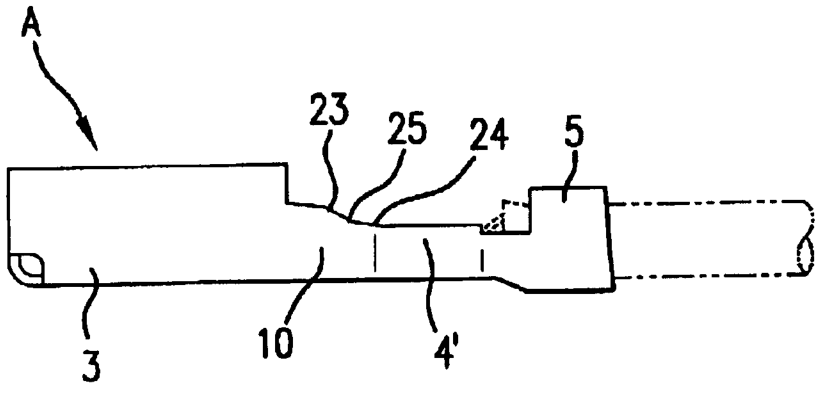
FIG. 12 is a side view of the terminal worked by the upper side-wall mold part provided with the double taper portion.

Accordingly, on the upper ends of the side walls 10 of the terminal A, a face 25 is formed between faces 23 and 24 so as to smoothly connect the faces 23 and 24, the face 23 being plastically deformed by the taper face 20, the face 24 being plastically deformed by the pressure face 19*b* so as to be connected to the conductor crimping portion 4' after clamping work (see FIG. 12). Accordingly, even if the difference between $h_2$ and $h_3$ is set to be larger than that in FIG. 8, loads are hardly concentrated.

The upper side-wall mold part 19' can be applied both to the mold $B_1$ in the first embodiment and to the mold $B_2$ in the second embodiment.

Although the aforementioned embodiments have shown the case where each of the upper side-wall mold part 19 and the intermediate upper mold part 21 is provided separately from the upper conductor mold part 15, the present invention can be applied also to the case where they are provided as an integral-form mold part with the mold part 15.

Although the embodiment in which the pressure face 19*b* of the upper side-wall mold part 19 is provided with the taper face 20 and the embodiment in which the intermediate taper face 22 is further provided have been described above, the present invention can be applied also to the case where the pressure face 19*b* is connected to the taper face 20 in any form so long as the stress generated in the side walls 10 can be relaxed.

According to the present invention, the following effects are obtained.

(1) In the terminal according to the first aspect of the present invention, the conductor crimping portion side end portions of side walls at a neck portion are work-deformed in the same manner as the conductor crimping portion. Accordingly, the conductor crimping portion side end portions are shaped so that the quantity of deformation is reduced gradually as it goes toward the opposite side end portions. Cracks which had been produced at the time of clamping by means of a mold in the background art are eliminated.

Accordingly, in order to reinforce the neck portion of the terminal, the height of the side walls at the neck portion can be set to be larger than the height in the background art.

(2) In the terminal according to the second aspect of the present invention, the side walls each of which has one end connected to a sheath clamping portion and the other end connected to a conductor crimping portion are shaped so that the one end is plastically deformed in the same manner as the sheath clamping portion. Accordingly, the quantity of deformation of the side walls is reduced gradually from the one end toward the other end so as to reach the quantity of deformation of the conductor crimping portion. Accordingly, the internal stress of the side walls is equalized so that cracks are prevented from occurring.

Accordingly, the height of the side walls can be set to be larger than the height in the background art.

(3) In the mold according to the third aspect of the present invention, one end of the pressure face of the upper side-wall mold part is substantially continuously connected to the pressure face of the upper electric-wire-clamping-portion mold part, and a taper face is formed on the other end side of the pressure face so as to be enlarged as it goes toward the other side. Accordingly, the terminal worked by the mold is prevented from cracking because one end of each of the side walls is work-deformed in the same manner as the electric-wire clamping portion so that the quantity of deformation is reduced gradually as it goes toward the other end portion. Accordingly, cracking can be prevented from occurring.

Because the size of the other end of the taper face is set such that the side walls are not pressed, no stress is produced in the opposite ends of the side walls connected to a non-deformed member (electric contact portion).

(4) In the mold according to the fifth aspect of the present invention, an intermediate upper mold part is provided between an upper conductor mold part and an upper sheath mold part so that the pressure faces are substantially continuously connected. Accordingly, the side walls provided between the conductor crimping portion and the sheath clamping portion of the terminal are smoothly deformed, so that the local concentration of stress is prevented from occurring.

(5) When an intermediate taper portion is added to the taper portion formed on the upper side-wall mold part of the mold to thereby form a double taper face, the side walls are further smoothly deformed so that the height of the side walls at the neck portion can be increased more greatly.

What is claimed is:

1. A terminal-crimping mold for crimping a terminal to an electric wire, the terminal which includes:

a base plate, an electric-wire clamping portion, into which the electric wire is insertable, provided on one end side of the base plate, and side walls erected from opposite sides of the base plate and continuously connected to the electric-wire clamping portion, the terminal-crimping mold, comprising:

a lower mold part including a lower conductor mold part, a lower sheath mold part, and a lower side-wall mold part continuously connected to the lower mold part; and an upper mold part associating with the lower mold part so that the electric-wire clamping portion of the terminal, is adapted to be crimped by the lower and upper mold parts to electrically connect the terminal to the electric wire, the upper mold part including:

an upper conductor mold part, an upper sheath mold part;

an upper side-wall mold part moved integrally with the upper mold part, wherein one end of a pressure face of the upper side-wall mold part is substantially continuously connected to a pressure face of the upper mold part; and a taper face formed on the other end side of the pressure face of the upper side-wall mold part so as to be enlarged toward the one end side of the pressure face of the upper side-wall mold part.

2. A terminal-crimping mold according to claim 1, wherein a size of the other end of the taper face is set to be a value when the side walls are not pressed.

3. A terminal-crimping mold according to claim 2, further comprising an intermediate taper face formed between a pressure face of the upper side-wall mold part and the taper face of the upper side-wall mold part so that the intermediate taper face has an intermediate taper angle between an angle of the pressure face of the upper side-wall mold pert and an angle of the taper face of the upper side-wall mold part.

4. A terminal-crimping mold according to claim 1, further comprising an intermediate taper face formed between a pressure face of the upper side-wall mold part and the taper face of the upper side-wall mold part so that the intermediate taper face has an intermediate taper angle between an angle of the pressure face of the upper side-wall mold part and an angle of the taper face of the upper side-wall mold part.

* * * * *